United States Patent
Strandborg et al.

(10) Patent No.: US 12,340,466 B2
(45) Date of Patent: Jun. 24, 2025

(54) MULTIRESOLUTION NEURAL NETWORKS FOR 3D RECONSTRUCTION

(71) Applicant: Varjo Technologies Oy, Helsinki (FI)

(72) Inventors: Mikko Strandborg, Helsinki (FI); Kimmo Roimela, Helsinki (FI)

(73) Assignee: Varjo Technologies Oy, Helsinki (JP)

( * ) Notice: Subject to any disclaimer, the term of this patent is extended or adjusted under 35 U.S.C. 154(b) by 303 days.

(21) Appl. No.: 18/306,295

(22) Filed: Apr. 25, 2023

(65) Prior Publication Data

US 2024/0362862 A1  Oct. 31, 2024

(51) Int. Cl.
| | |
|---|---|
| *G06T 17/00* | (2006.01) |
| *G06F 3/01* | (2006.01) |
| *G06T 7/90* | (2017.01) |
| *G06V 10/25* | (2022.01) |
| *G06V 10/74* | (2022.01) |
| *G06V 10/82* | (2022.01) |

(52) U.S. Cl.
CPC ............ *G06T 17/005* (2013.01); *G06F 3/013* (2013.01); *G06T 7/90* (2017.01); *G06V 10/25* (2022.01); *G06V 10/761* (2022.01); *G06V 10/82* (2022.01); *G06T 2207/10024* (2013.01); *G06T 2207/20081* (2013.01)

(58) Field of Classification Search
CPC ............. G06T 17/005; G06T 7/90; G06T 2207/10024; G06T 2207/20081; G06T 2207/20084; G06F 3/013; G06V 10/25; G06V 10/761; G06V 10/82
See application file for complete search history.

(56) References Cited

U.S. PATENT DOCUMENTS

| | | | |
|---|---|---|---|
| 11,810,250 B2 * | 11/2023 | Chen | .................. G06T 17/20 |
| 2023/0336758 A1 * | 10/2023 | Ikonin | .................. H04N 19/59 |
| 2024/0005593 A1 * | 1/2024 | Yu | ........................ G06T 19/20 |

* cited by examiner

*Primary Examiner* — Edward Martello
(74) *Attorney, Agent, or Firm* — Ziegler IP Law Group, LLC.

(57) ABSTRACT

A hierarchical data structure has sets of nodes representing a 3D space of an environment at different granularity levels. Sets of neural networks at different granularity levels are trained. For a portion of an output image, a granularity level at which the portion is to be reconstructed is determined. A corresponding node is identified; the node having sets of child nodes. A set of child nodes is selected at the granularity level at which the portion is to be reconstructed. For a child node, a cascade of neural networks is utilised to reconstruct the portion. Granularity level of $N+1^{th}$ neural network is higher than that of $N^{th}$ neural network. Input of a neural network includes outputs of at least a predefined number of previous neural networks.

23 Claims, 3 Drawing Sheets

US 12,340,466 B2

MULTIRESOLUTION NEURAL NETWORKS FOR 3D RECONSTRUCTION

TECHNICAL FIELD

The present disclosure relates to computer-implemented methods incorporating multiresolution neural networks for three-dimensional (3D) reconstructions. The present disclosure also relates to systems incorporating multiresolution neural networks for 3D reconstructions. The present disclosure further relates to computer program products incorporating multiresolution neural networks for 3D reconstructions.

BACKGROUND

With advancements in evolving technologies such as immersive extended-reality (XR) technologies, demand for high-quality image generation has been increasing. It is desired that the image generation is performed in real time or near-real time. Several advancements are being made to develop image generation techniques that facilitate high-quality and realistic three-dimensional (3D) reconstruction of a real-world environment. Some existing image generation techniques typically rely on environment reconstruction using 3D point clouds, 3D meshing, machine learning (ML)-based approaches (for example, such as Neural Radiance Fields (NeRFs), Kilo-NeRFs, Block-NeRFs, Decomposed Radiance Fields (DeRFs), Instant Neural Graphics Primitives (Instant-NGP), Neural Sparse Voxel Fields (NSVF), and the like), image-based techniques, and the like.

However, existing techniques and equipment for implementing 3D reconstruction are associated with several limitations. Firstly, the existing techniques are inefficient in terms of managing a memory budget for storing data structures comprising information pertaining to a 3D space of the real-world environment. In such a case, when these data structures are employed as input for generating images from new viewpoints, image reconstruction is performed with considerable latency/delay. Moreover, when it is required to perform the image reconstruction in real time, the existing techniques cannot be scaled up to a high enough quality (namely, high image resolution) on the existing equipment. For example, an image resolution provided by a 3D data structure is limited by an underlying 3D voxel grid, making scaling to higher resolutions extremely expensive.

This also adversely impacts viewing experiences provided by the evolving XR technologies which utilize the images generated using such data structures. Secondly, some existing techniques implement the 3D reconstruction, for example, using a static 3D mesh which cannot be updated easily. Thus, image reconstruction cannot be performed in real time or near-real time, and processing resources and time required for updating the static 3D mesh are considerably high. Furthermore, storing redundant object information into the data structures makes such data structures very bulky to use.

Thirdly, even though neural networks like NeRFs are capable of generating high quality images, they are not fast enough for real-time rendering of high-resolution images that are suitable for XR applications. Fourthly, existing NeRF models rely on utilizing volumetric information of the 3D space for performing the image reconstruction. This undesirably increases a memory budget for storing data structures comprising such volumetric information. Moreover, training of such NeRF models is resource-intensive and time-consuming. Fifthly, resolution provided by the existing NeRF models does not scale appropriately to differences in distances of a new viewpoint from objects present in a scene of the real-world environment. So, an entirety of a 3D volume of said scene is evaluated at a same full resolution, for performing the image reconstruction. In other words, the existing NeRF models do not exhibit scalability, for example, in terms of providing the image reconstruction at different levels, for example, such as when an object is located considerably far from the new viewpoint, or is outside a gaze area of a user. Moreover, when image reconstruction is to be performed for highly complex and large-scale scenes of the real-world environment, training the existing NeRF models becomes computationally-intensive, and requires more time. Sixthly, when each node of an existing NeRF model is independent and a level-of-detail (LOD) model is to be retrofitted with said NeRF model, redundant information is stored for each node, and training of the existing NeRF model becomes cumbersome and time-consuming. Furthermore, such a NeRF model does not directly support dynamic content, as representation of the scene is encoded into weights of the NeRF model.

Therefore, in light of the foregoing discussion, there exists a need to overcome the aforementioned drawbacks.

SUMMARY

The present disclosure seeks to provide a computer-implemented method, a system, and a computer program product incorporating multiresolution neural networks for three-dimensional (3D) reconstruction. The aim of the present disclosure is achieved by a computer-implemented method, a system, and a computer program product which incorporate multiresolution neural networks for 3D reconstruction as defined in the appended independent claims to which reference is made to. Advantageous features are set out in the appended dependent claims.

Embodiments of the present disclosure substantially eliminate or at least partially address the aforementioned problems in the prior art, and facilitate in highly accurate and realistic 3D reconstruction of objects represented in output images by way of utilizing multiresolution neural networks in said cascade, thereby enabling accurate and realistic representation of 3D points in the given real-world environment at corresponding granularity levels determined therefor, in a computationally-efficient and a time-efficient manner.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
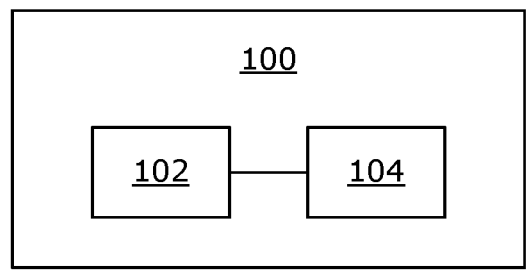
FIG. 1 illustrates a block diagram of an architecture of a system incorporating multiresolution neural networks for three-dimensional (3D) reconstruction, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:
  receiving a plurality of colour images of a given real-world environment, and viewpoint information indicative of corresponding viewpoints from which the plurality of colour images are captured;
  utilising a hierarchical data structure to represent a 3D space occupied by the given real-world environment at a plurality of granularity levels, the hierarchical data structure comprising a plurality of nodes, wherein the plurality of nodes comprise different sets of nodes at respective ones of the plurality of granularity levels;
  training a plurality of neural networks for 3D reconstruction of objects represented by respective ones of the plurality of nodes, based on the plurality of colour images and the viewpoint information, wherein the plurality of neural networks comprise different sets of neural networks corresponding to the different sets of nodes at the respective ones of the plurality of granularity levels; and
  for a given portion of an output image that is to be reconstructed from a perspective of a new viewpoint,
  determining a granularity level at which the given portion of the output image is to be reconstructed, based on at least one of: a resolution at which the given portion is being reconstructed, a distance of the new viewpoint from objects being represented in the given portion, whether the given portion corresponds to a user's gaze;
  identifying a given node in the hierarchical data structure that corresponds to a given region of the 3D space within which said objects lie, wherein the given node has different sets of child nodes;
  selecting a set of child nodes, from amongst the different sets of child nodes, that is at the granularity level at which the given portion of the output image is to be reconstructed; and
  for a given child node of the selected set of child nodes, utilising a cascade of neural networks that ends at a neural network corresponding to the given child node, to reconstruct the given portion of the output image, wherein a granularity level of an N+1$^{th}$ neural network in the cascade is higher than a granularity level of an N$^{th}$ neural network in the cascade, further wherein an input of a given neural network in said cascade comprises outputs of at least a predefined number of previous neural networks in said cascade.

In a second aspect, an embodiment of the present disclosure provides a system comprising:
  at least one data repository; and
  at least one server configured to:
    receive a plurality of colour images of a given real-world environment, and viewpoint information indicative of corresponding viewpoints from which the plurality of colour images are captured;
    utilise a hierarchical data structure to represent a 3D space occupied by the given real-world environment at a plurality of granularity levels, the hierarchical data structure comprising a plurality of nodes, wherein the plurality of nodes comprise different sets of nodes at respective ones of the plurality of granularity levels, and wherein the hierarchical data structure is stored at the at least one data repository;
    train a plurality of neural networks for 3D reconstruction of objects represented by respective ones of the plurality of nodes, based on the plurality of colour images and the viewpoint information, wherein the plurality of neural networks comprise different sets of neural networks corresponding to the different sets of nodes at the respective ones of the plurality of granularity levels; and
    for a given portion of an output image that is to be reconstructed from a perspective of a new viewpoint,
      determine a granularity level at which the given portion of the output image is to be reconstructed, based on at least one of: a resolution at which the given portion is being reconstructed, a distance of the new viewpoint from objects being represented in the given portion, whether the given portion corresponds to a user's gaze;
      identify a given node in the hierarchical data structure that corresponds to a given region of the 3D space within which said objects lie, wherein the given node has different sets of child nodes;
      select a set of child nodes, from amongst the different sets of child nodes, that is at the granularity level at which the given portion of the output image is to be reconstructed; and
      for a given child node of the selected set of child nodes, utilise a cascade of neural networks that ends at a neural network corresponding to the given child node, to reconstruct the given portion of the output image, wherein a granularity level of an N+1$^{th}$ neural network in the cascade is higher than a granularity level of an N$^{th}$ neural network in the cascade, further wherein an input of a given neural network in said cascade comprises outputs of at least a predefined number of previous neural networks in said cascade.

In a third aspect, an embodiment of the present disclosure provides a computer program product comprising a non-transitory machine-readable data storage medium having stored thereon program instructions that, when executed by a processor, cause the processor to execute steps of a computer-implemented method of the first aspect.

The present disclosure provides the aforementioned method, the aforementioned system, and the aforementioned computer program product for facilitating highly accurate and realistic 3D reconstruction of objects represented in output images by way of utilising multiresolution neural networks in said cascade, thereby enabling accurate and realistic representation of 3D points in the given real-world environment, in a computationally-efficient and a time-efficient manner. The method utilises the hierarchical data structure to represent the 3D space of the given real-world environment at different granularity levels, and is susceptible to be used for reconstructing output images from various new viewpoints at different granularity levels. This makes the method and the system more memory-efficient, as compared to the prior art. Moreover, the hierarchical data structure can be updated easily, and the method can be easily scaled up to a high enough quality (for example, a certain granularity level that is required from amongst the different granularity levels) on existing equipment. Training the plurality of neural networks at different granularity levels in a manner described in the present disclosure requires considerably lesser processing resources and time. Furthermore, upon such training, utilising the cascade of neural networks facilitates in accurately and realistically reconstructing the given portion of the output image at the determined granularity level, in a computationally-efficient and time-efficient manner. This is because upon training the different sets of neural networks at the different granularity levels, an output from at least one previous neural network in said cascade would be successively improved by a subsequent neural network in said cascade, until an output corresponding to the selected granularity level is achieved, which otherwise would have been highly computationally-intensive and time-consuming if a single neural network were to be trained and utilised for performing the aforesaid reconstruction (namely, as in the prior art). The method and the system are simple, robust, support real-time high-quality 3D reconstruction at different granularity levels, and can be implemented with ease.

Notably, the at least one server controls an overall operation of the system. The at least one server is communicably coupled to the at least one data repository. It will be appreciated that the at least one data repository could be implemented, for example, such as a memory of the at least one server, a memory of a device comprising at least one camera (using which the plurality of colour images are captured), a memory of a computing device communicably coupled to said device, a removable memory, a cloud-based database, or similar.

In some implementations, the at least one server is implemented as a remote server. In such implementations, the remote server receives the plurality of colour images from the at least one data repository, or from the device comprising the at least one camera. In an example, the remote server could be a cloud server that provides a cloud computing service. Examples of the device include, but are not limited to, a head-mounted display (HMD) device and a teleport device. In other implementations, the at least one server is implemented as a processor of the device comprising the at least one camera or as a processor of the computing device communicably coupled to the device. Examples of the computing device include, but are not limited to, a laptop, a desktop, a tablet, a phablet, a personal digital assistant, a workstation, and a console.

The term "head-mounted display" device refers to a specialized equipment that is configured to present an extended-reality (XR) environment to a user when said HMD device, in operation, is worn by a user on his/her head. The HMD device is implemented, for example, as an XR headset, a pair of XR glasses, and the like, that is operable to display a scene of the XR environment to the user. The term "extended-reality" encompasses virtual reality (VR), augmented reality (AR), mixed reality (MR), and the like.

The term "teleport device" refers to a specialized equipment that is capable of facilitating virtual teleportation.

It will be appreciated that the term "at least one server" refers to "a single server" in some implementations, and to "a plurality of servers" in other implementations. When the system comprises the single server, all operations of the system can be performed by the single server. When the system comprises the plurality of servers, different operations of the system can be performed by different (and specially configured) servers from amongst the plurality of servers. As an example, a first server from amongst the plurality of servers may be configured to utilise a hierarchical data structure to represent the 3D space occupied by the given real-world environment at the plurality of granularity levels, and a second server from amongst the plurality of servers may be configured to utilise the cascade of neural networks to reconstruct the given portion of the output image.

Throughout the present disclosure, the term "camera" refers to an equipment that is operable to detect and process light signals received from the given real-world environment, so as to capture image(s) of the given real-world environment. Such images could be colour images and/or depth images of the given real-world environment. Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Alternatively, optionally, the at least one camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera.

Optionally, the at least one server further receives a plurality of depth images corresponding to the plurality of colour images. In some implementations, both a given colour image and a given depth image are captured using a single camera. As an example, the aforesaid images may be captured as an RGB-D image using the single camera. In other implementations, a given colour image and a given depth image are captured separately by using separate cameras. As an example, the given colour image may be captured by an RGB camera, while the given depth image may be captured by a ToF camera. In yet other implementations, a given colour image is captured using at least one visible-light camera, and a given depth image is generated (for example, by the at least one server) using one of:
  stereo disparity between a stereo pair of visible-light images captured by the at least one visible-light camera,
  a 3D model of the given real-world environment and a viewpoint of the at least one camera, the 3D model being a data structure comprising comprehensive information pertaining to the 3D space of the given real-world environment. Techniques for generating such 3D models are well-known in the art.

It will be appreciated that the given depth image could also be generated using at least one of: depth from focus, depth from reflectance, depth from shading, when the at least one camera has at least one of: a coded aperture, a sensor chip having phase detection autofocus (PDAF) pixels, a sensor chip in which some of its pixels are IR pixels. Such IR pixels can detect, for example, a structured light at an active-IR illumination. It will also be appreciated that the given depth image could be generated even without using the depth camera. In this regard, the given depth image could be generated by using a monocular depth estimation technique, wherein a single (monocular) RGB image is used for estimating depth values to generate the given depth image.

It is to be understood that the given colour image is a visual representation of the given real-world environment. The term "visual representation" encompasses colour information represented in the given colour image, and additionally optionally other attributes associated with the given colour image (for example, such as depth information, luminance information, transparency information, and the like).

Optionally, the colour information represented in the given colour image is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) values, Hue-Saturation-Intensity (HSI) values, blue-difference and red-difference chroma components (YCbCr) values.

Furthermore, the term "depth image" refers to an image comprising information pertaining to optical depths of objects or their parts present in the given real-world environment. In other words, the given depth image provides information pertaining to distances (namely, the optical depths) of surfaces of the objects or their parts from a given viewpoint of the at least one camera. In an example, the depth image could be an image comprising a plurality of pixels, wherein a pixel value of each pixel in said image indicates an optical depth of its corresponding real point/region within the given real-world environment. The term "object" refers to a physical object or a part of the physical object present in the given real-world environment. The object could be a living object (for example, such as a human, a pet, a plant, and the like) or a non-living object (for example, such as a wall, a window, a toy, a poster, a lamp, and the like).

Throughout the present disclosure, the term "viewpoint" encompasses both a viewing position at which the at least one camera is positioned in the given real-world environment as well as a viewing direction in which the at least one camera is capturing the given colour image (and optionally the given depth image). It will be appreciated that multiple objects or their parts present in the given real-world environment span across a field of view of the at least one camera; therefore, for the given colour image that is captured from a given viewpoint, light reflecting off these objects or their parts is incident upon a sensor chip of the at least one camera at different incident angles. As an example, when an angular width of a horizontal field of view of the at least one camera is 90 degrees, these objects or their parts are captured in the given colour image such that information pertaining to the objects or their parts is captured from −45 degrees to +45 degrees from a centre of the horizontal field of view. Thus, a given viewpoint from which a given object or its part is captured not only depends on the viewing position and the viewing direction of the at least one camera, but also depends on which portion of the field of view of at least one camera is the given object or its part captured.

Optionally, the system further comprises tracking means for tracking viewpoints of the at least one camera. It will be appreciated that the tracking means could be implemented as at least one of: an optics-based tracking system (which utilizes, for example, infrared beacons and detectors, IR cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). Optionally, a processor of the device is configured to process tracking data, collected by the tracking means, for tracking the viewpoints of the at least one camera. The tracking means may employ an outside-in tracking technique, an inside-out tracking technique, or a combination of both the aforesaid techniques, for collecting the tracking data. The tracking data may be in form of images, IMU/TIMU values, motion sensor data values, magnetic field strength values, or similar.

Optionally, the at least one camera is arranged on the device present in the given real-world environment. Such a device could be arranged at a fixed location within the given real-world environment. Optionally, in such a case, the device is stationary in the given real-world environment. Additionally or alternatively, the device could be a wearable device being worn by a user present in the given real-world environment. In such a case, a location of the device changes with a change in a location of its user. Likewise, the device could be arranged on, for example, a drone, a robot, or similar. As an example, the device could be arranged on a support structure that is capable of a 3D rotation (and additionally, capable of a translation motion). The support structure can be moved to any required location in the given real-world environment. In some implementations, a plurality of such devices may employ peer-to-peer (P2P) computing for implementing the aforementioned method of the present disclosure.

Beneficially, the at least one camera is movable in the given real-world environment, so as to capture the plurality of colour images and optionally the plurality of depth images from a plurality of viewpoints. In this regard, a pose of the at least one camera changes, i.e., at least an orientation of the at least one camera changes with respect to time. It will be appreciated that at least the orientation of the at least one camera may be adjusted (namely, changed) by using a motorised actuator. In such a case, information pertaining to at least the orientation of the at least one camera can be accurately known to the at least one server. The actuator may be driven by an actuation signal, for example, such as a piezoelectric force, an electromagnetic force, a mechanical torque, an electric current, or similar. Notably, different poses of the at least one camera serve as different (known) viewpoints for capturing the plurality of colour images and optionally the plurality of depth images. The term "pose" encompasses a position and/or an orientation.

Optionally, 3D positions and 3D orientations of the viewpoints are represented in a given coordinate system. In this regard, the given coordinate system may define a position and an orientation of a given viewpoint (from which a given colour image and optionally a given depth image are captured) within the 3D space of the given real-world environment. As an example, the given coordinate system may be a Cartesian coordinate system. Optionally, the given coordinate system has a predefined origin and three mutually perpendicular coordinate axes. The three mutually perpendicular coordinate axes could be, for example, X, Y, and Z axes. Optionally, in this regard, a 3D position of the given viewpoint in the given coordinate system is expressed as (x, y, z) position coordinates along the X, Y and Z axes, respectively. Likewise, a 3D orientation of the given viewpoint in the given coordinate system could be expressed, for example, using rotation quaternions, Euler angles, rotation matrices, and the like. The 3D orientation of the given viewpoint corresponds to a direction of a depth axis of a given image from a 3D position of the at least one camera.

Throughout the present disclosure, the term "hierarchical data structure" refers to a 3D data structure that comprises information pertaining to (objects or their parts present within) the 3D space of the given real-world environment at different granularity levels (namely, at different levels of detail). At a coarsest granularity level (namely, a lowest granularity level or a lowest level of detail), the aforesaid information would be non-comprehensive and relatively less accurate (i.e., of a relatively low resolution), whereas at a finest granularity level (namely, a highest granularity level or a highest level of detail), the aforesaid information would be highly comprehensive and accurate (i.e., of a relatively very high resolution). Examples of the hierarchical data structure include, but are not limited to, an Octree, a Binary Space Partitioning (BSP) tree, a Quadtree, a bounding volume hierarchy (BVH), and hashed voxels. As an example, an Octree can be implemented as a semi-regular tree structure, wherein at each successive granularity level, the 3D space is divided approximately half along each dimension. The aforesaid hierarchical data structures and their utilisation for representing the 3D space are well-known in the art.

It will be appreciated that a given node of the hierarchical data structure represents objects or their parts present within a corresponding region of the 3D space. Moreover, a given region of the 3D space may correspond to more than one node of the hierarchical data structure. As an example, the plurality of granularity levels could be understood to begin at a root level, and to increase on going away from the root level towards a highest (i.e., deepest) granularity level. In a first example, at the root level (i.e., a lowest granularity level), a single node may represent objects or their parts present within an entire volume of 100×100×100 cubic centimetres of the 3D space. Herein, a resolution-per-node is 1. For a first granularity level (i.e., a first level after the root level), each node of the hierarchical data structure may represent objects or their parts present within a volume of 50×50×50 cubic centimetres of the 3D space. Herein, a resolution-per-node is 2. For a second granularity level (i.e., an intermediate level after the first level), each node of the hierarchical data structure may represent objects or their parts present within a volume of 25×25×25 cubic centimetres of the 3D space. Herein, a resolution-per-node is 4. For a third granularity level (for example, a highest level after the intermediate level), each node of the hierarchical data structure may represent objects or their parts present within a volume of 12.5×12.5×12.5 cubic centimetres of the 3D space. Herein, a resolution-per-node is 8. The technical benefit of utilising the hierarchical data structure and the plurality of granularity levels is that it facilitates in representing the 3D space at different resolutions in a spatially-variable manner.

Furthermore, a given set of nodes is at a given granularity level from amongst the plurality of granularity levels. Optionally, the given set of nodes comprises two or more nodes. It will be appreciated that nodes in a same set are at a same granularity level. Referring to the aforementioned first example, there may be 3 sets of nodes, wherein a first set has 8 nodes at the first granularity level, a second set has 64 nodes at the second granularity level, and a third set has 512 nodes at the third granularity level.

Optionally, the method further comprises creating the hierarchical data structure by iteratively dividing the 3D space into the plurality of nodes, wherein a highest granularity level to which a given node of the hierarchical data structure is to be divided is determined based on a highest resolution in which a portion of at least one of the plurality of colour images representing a given region of the 3D space that corresponds to the given node is available. Optionally, the at least one server is configured to iteratively divide the 3D space into the plurality of nodes using a space partitioning scheme. Examples of the space partitioning scheme include, but are not limited to, an Octree (including a Sparse Voxel Octree) Partitioning scheme, a Binary Space Partitioning (BSP) scheme, a Quadtree Partitioning scheme, a k-dimensional tree partitioning scheme, a bounding volume hierarchy (BVH) partitioning scheme, and a voxel hashing scheme. The plurality of nodes enable in effectively modelling the 3D space of the given real-world environment.

It will be appreciated that the phrase "iteratively dividing the 3D space" means dividing the 3D space into smaller-sized nodes recursively in a step-by-step manner until nodes at the (predefined) highest granularity level are achieved. In other words, upon an initial division of the 3D space into a particular number of nodes at a given granularity level that is lesser than the highest granularity level, a given node is to be further and repeatedly divided in a similar manner, until the nodes at the highest granularity level are achieved. The highest granularity level may be user-defined or system-defined. It will also be appreciated that each node of the hierarchical data structure is not necessarily to be divided according to the highest granularity level. This may particularly be beneficial in a scenario, for example, such as when a given node represents an object such as a wall or represents an empty space, present within a corresponding region of the 3D space; in such a scenario, it may not be beneficial to divide the nodes according to the highest granularity level. It is to be understood that the highest granularity level would define a final size of the given node and a highest level of detail of the given region that corresponds to the given node.

Information pertaining to a resolution (for example, in terms of pixel-per-degree (PPD)) of each image from amongst the plurality of colour images is already accurately known to the at least one server, thus the highest resolution in which said portion is available is also accurately known. Therefore, the highest granularity level to which the given node is to be divided can be selected accordingly. In this regard, the at least one server may utilise a predefined correlation between the highest resolution in which said portion is available and the highest granularity level that is to be selected for dividing the given node.

Notably, the plurality of neural networks are trained for the 3D reconstruction by using the plurality of colour images and the viewpoint information. In this regard, the plurality of colour images and the viewpoint information are served as a training dataset to the plurality of neural networks. This is because the plurality of colour images and the viewpoint information comprises comprehensive information pertaining to the objects present within the 3D space of the given real-world environment from different perspectives. During the aforesaid training, the plurality of neural networks learn from the aforesaid comprehensive information in order to be able to accurately and realistically perform 3D reconstruction of the objects being represented in the given portion of the output image. It will be appreciated that training of the plurality of neural networks could be performed in a parallel manner, i.e., different neural networks corresponding to different nodes could be trained in parallel. Neural networks and their training is well-known in the art.

Optionally, the at least one server is configured to train a given neural network corresponding to a given node, based on portions of the plurality of colour images that depict objects lying inside the given node. Optionally, in this regard, the at least one server is configured to identify the portions of the plurality of colour images that depict the objects lying inside the given node, based on corresponding viewpoints of the plurality of colour images and the plurality of depth images corresponding to the plurality of colour images. It will be appreciated that embeddings representing information pertaining to positions of corners of nodes in the hierarchical data structure (as described later in detail) could be effectively employed as training parameters for the given neural network. Such embeddings are utilised for training the given neural network individually for different sub-volumes (namely, regions) of a full 3D reconstruction. Additionally, there could be at least one neural network that is global for the 3D reconstruction rather than spatially varying with respect to different granularity levels. For example, one neural network at a low granularity level could be used in global context, i.e., for reconstructing low-frequency features of the objects, while another neural network at a high granularity level could be used for reconstructing high-frequency features of the objects. This may result in more effective 3D reconstruction.

Furthermore, optionally, for a given neural network at a given granularity level (that is lower than the highest granularity level), ground-truth images are generated by down-scaling and/or convoluting the plurality of (original) colour images to match the given granularity level. In this regard, when a given (original) colour image is downscaled and/or convolved to generate a corresponding ground-truth image matching the given granularity level, a resolution and visual details of the given (original) colour image are deliberately lowered to make it consistent with the given granularity level at which the given neural network (upon training) would be utilised to generate output images. In this manner, pixels of a generated output image can be appropriately compared with respective pixels of the corresponding ground-truth image, in order to be able to continuously train the given neural network for improved accuracy. Herein, the term "ground-truth image" refers to an ideal expected output image that is expected to be generated using the given neural network at the given granularity level. It is to be understood that for a first granularity level that is higher than a second granularity level, a ground-truth image for a neural network at the first granularity level would have considerably higher resolution and would represent higher visual details, as compared to a ground-truth image for another neural network at the second granularity level. Techniques for downscaling and/or convolving an image are well-known in the art.

A given neural network from amongst the plurality of neural networks corresponds to a given node at a given granularity level. In other words, each node at the given granularity level is associated with an individual neural network. As an example, assuming that none of the nodes is an empty node, there may be 3 sets of neural networks, wherein a first set has 8 neural networks corresponding to respective ones of 8 nodes at a first granularity level, a second set has 64 neural networks corresponding to respective ones of 64 nodes at a second granularity level, and a third set has 512 neural networks corresponding to respective ones of 512 nodes at a third granularity level, the third granularity level being higher than both the first granularity level and the second granularity level, and the second granularity level being higher than the first granularity level.

It will be appreciated that the different sets of neural networks corresponding to the different sets of nodes are capable of generating output images at different resolutions corresponding to their respective granularity levels. All the neural networks in a same set would be capable of generating the output images at a same resolution. Moreover, different portions of the same output image can be generated using the different sets of neural networks, when required, thereby facilitating in generating output images having spatially-variable resolutions. For example, a second set of neural networks may be utilised to generate a central portion of a given output image at a second resolution, and a first set of neural networks may be utilised to generate a remaining portion surrounding the central portion of the given output image at a first resolution, the second resolution being higher than the first resolution. However, multiple neural networks need not necessarily be always used to generate the output images. For example, when a resolution at which an output image is to be generated corresponds to the lowest granularity level, only a single neural network from amongst the plurality of neural networks would be utilised to generate the output image matching to the lowest granularity level. In such a case, the cascade of neural networks (as described later in detail) would comprise the single neural network.

Throughout the present disclosure, the term "output image" refers to a reconstructed colour image that is a visual representation of the given real-world environment from the perspective of the new viewpoint, said visual representation being generated using both the hierarchical data structure and the cascade of neural networks.

It will be appreciated that different portions of the output image can be reconstructed at different granularity levels namely, at different resolutions. The output image generated in this manner would have a spatially-variable resolution (for example, as discussed earlier). In this regard, the at least one server is configured to perform the aforementioned steps of determining the granularity level, identifying the given node, selecting the set of child nodes, and utilising the cascade of neural networks for each portion of the output image.

Notably, for reconstructing the given portion of the output image, the granularity level at which the given portion is to be reconstructed is determined. Optionally, greater the resolution at which the given portion is being reconstructed, greater is the granularity level at which the given portion is to be reconstructed, and vice versa. Optionally, in this regard, the at least one server is configured to utilise a predefined correlation between said resolution and the granularity level. It will be appreciated that the predefined correlation may not be common for every 3D reconstruction, and thus may vary depending on real-world content that is to be reconstructed. For example, when said resolution lies in a range of 0.5 millimetres per pixel to 2 millimetres per pixel, the given portion may be reconstructed at a second granularity level, whereas when said resolution lies in a range of 2 centimetres per pixel to 5 centimetres per pixel, the given portion may be reconstructed at a first granularity level, the second granularity level being higher than the first granularity level.

Alternatively or additionally, optionally, greater the distance of the new viewpoint from the objects represented in the given portion, lower is the granularity level, and vice versa. This is because when the objects represented in the given portion are far (i.e., at a considerable distance) from the new viewpoint, said objects could be acceptably accurately reconstructed by utilising a relatively low granularity level, as visual details of said objects from the new viewpoint may be likely to be compromised and thus need not necessarily be highly accurately and precisely reconstructed. On the other hand, when the objects represented in the given portion are near the new viewpoint, said objects could be highly accurately reconstructed by utilising a relatively high granularity level, as visual details of said objects from the new viewpoint may be likely to be prominent and thus need highly accurate reconstruction. Optionally, in this regard, the at least one server is configured to utilise a predefined correlation between the distance of the new viewpoint from the objects and the granularity level at which the given portion is to be reconstructed. Such a predefined correlation may depend on a resolution at which the given portion is being reconstructed and a field of view captured from a perspective the new viewpoint. Given the camera parameters (for example, such as a resolution provided by an image sensor, lens intrinsic parameters, and the like), a size of a sensor pixel projected to the distance of the new viewpoint from a given object can be computed, and then the granularity level can be ascertained. For example, when sensor pixels are projected onto a surface at a spacing of 3 millimetres per pixel, it can be said that the object is being captured at a resolution of 3 millimetres per pixel, and the granularity level is selected accordingly.

Yet alternatively or additionally, optionally, when the given portion corresponds to the user's gaze, a relatively high granularity level is determined, whereas when the given portion does not correspond to the user's gaze, a relatively low granularity level is determined. This is because when the given portion corresponds to the user's gaze, the given portion would be perceived by user's eyes with high visual acuity, as compared to a remaining portion of the output image that does not correspond to the user's gaze. Therefore, a high granularity level facilitates in reconstructing the given portion in a highly comprehensive and accurate manner. This allows for implementing foveation to limit a resolution in different portions of the output image. Optionally, in this regard, the at least one server is configured to utilise a predefined highest granularity level that is to be employed when the given portion corresponds to the user's gaze.

Still alternatively or additionally, optionally, the granularity level at which the given portion is to be reconstructed is determined, further based on a network bandwidth between the at least one server and a client device (to which the output image is to be sent). This allows for iterative refinement of the selected set of child nodes based on the network bandwidth, and facilitates in saving processing resources and processing time of the at least one server.

Optionally, the at least one server is configured to obtain, from the device, the information indicative of gaze directions of the user's eyes. Optionally, in this regard, the device comprises gaze-tracking means. The term "gaze direction" refers to a direction in which a user's eye is gazing. The gaze direction may be represented by a gaze vector. Furthermore, the term "gaze-tracking means" refers to a specialized equipment for detecting and/or following a gaze of the user's eye. The gaze-tracking means could be implemented as contact lenses with sensors, cameras monitoring a position of a pupil of the user's eye, and the like. Such gaze-tracking means are well-known in the art. It will be appreciated that a gaze area on the output image may be determined, based on the gaze directions of the user's eyes, said gaze area being a two-dimensional (2D) screen-space area or a 3D volume estimated based on a convergence of the gaze directions of user's eyes.

Optionally, the at least one server is configured to identify the given region of the 3D space within which said objects (namely, the objects being represented in the given portion) lie, based on information pertaining to the new viewpoint, at least one intrinsic parameter (for example, such as a field-of-view) of the at least one camera, and the 3D model of the given real-world environment. In this regard, the new viewpoint may be mapped onto the 3D model for identifying the given region of the 3D space in the 3D model. Once the given region is identified, the given node corresponding to the given region can be easily and accurately identified in the hierarchical data structure, as the hierarchical data structure representing the 3D space is readily available to the at least one server.

Throughout the present disclosure, the term "childnode" refers to a node that is obtained upon iteratively dividing the given node (namely, a parent node), wherein a granularity level of said child node is higher than a granularity level of the given node. It will be appreciated that the given node has different sets of child nodes that are at different higher granularity levels as compared to a granularity level of the given node. In other words, upon dividing the given node once, the given node would initially have a set of two or more child nodes at a granularity level that is higher than the granularity level of the given node. When said two or more child nodes of the given node are further divided, the given node would now have another set of child nodes at a granularity level that is higher than the granularity level of the set of two or more child nodes. In this manner, the given node has two different sets of child nodes at two different granularity levels. It is to be understood that such iterative division of the given node could continue to occur until child nodes at the highest granularity level are obtained (as discussed earlier). In a second example, a given node at a first granularity level may have two sets of child nodes namely, a first set of 8 child nodes at a second granularity level and a second set of 64 child nodes at a third granularity level, wherein the third granularity level is higher than both the first granularity level and the second granularity level, and the second granularity level is higher than the first granularity level.

Upon identifying the given node and the different sets of child nodes associated with the given node, a particular set of child nodes that is at the (same) granularity level at which the given portion of the output image is to be reconstructed, is selected by the at least one server. Such a selection can be easily performed (in real time or near-real time) as information pertaining to granularity levels of the different sets of child nodes is readily and accurately available to the at least one server.

In some implementations, when the given portion of the output image is to be reconstructed at a granularity level that is higher than the lowest granularity level, a set of child nodes matching said granularity level (as discussed earlier) is selected, and the cascade of neural networks would comprise more than one neural network. In other implementations, when the given portion of the output image is to be reconstructed at the lowest granularity level, no set of child nodes is required to be selected, and the cascade of neural networks would comprise a single neural network from amongst the plurality of neural networks. The single neural network would utilise a set of N embeddings for the given node itself (as discussed later in detail).

Notably, for each non-empty child node in the selected set of child nodes, the cascade of neural networks from amongst the plurality of neural networks is utilised to reconstruct the given portion of the output image. In this regard, information generated by at least one previous neural network in said cascade is successively passed to subsequent neural network(s) in said cascade. In simpler words, an output from a lower level neural network is fed as an input to a subsequent neural network. Optionally, subsequently, outputs from both the lower level neural network and the subsequent neural network are concatenated, and fed as an input to a higher level neural network, for further processing. The technical benefit of utilising such a cascade of neural networks facilitates in accurately and realistically reconstructing the given portion at the selected granularity level, in a computationally-efficient and time-efficient manner. This is because upon training the different sets of neural networks at the different granularity levels, an output from the at least one previous neural network would be successively improved by the subsequent neural network(s) until an output corresponding to the selected granularity level is achieved, which otherwise would have been computationally-intensive and time-consuming when a single neural network is to be trained and utilised for performing the aforesaid reconstruction.

It will be appreciated that the cascade of neural networks comprises neural networks that correspond to parent nodes (namely, ancestor nodes) of the given child node, in addition to the neural network corresponding to the given child node. It is to be understood that granularity levels of such parent nodes are lower than a granularity level of the given child node (i.e., the selected granularity level). The given child node may have several parent nodes including a root node at a lowest granularity level. Moreover, in the hierarchical data structure, there could also be a previous child node from which the given child node is generated (for example, using recursive division as discussed earlier), a granularity level of the previous child node being lower than the granularity level of the given child node. Thus, the previous child node could be considered as a parent node for the given child node.

Optionally, when the root node and the given node are served as the parent nodes for the given child node, the cascade of neural networks comprises a neural network corresponding to the root node at the lowest granularity level, a neural network corresponding to the given node at a granularity level higher than the lowest granularity level, and the neural network corresponding to the given child node at the determined granularity level. Referring to the aforementioned second example, for a given child node from amongst the second set of 64 child nodes at the third granularity level, the cascade of neural networks may comprise three neural networks namely, a first neural network corresponding to the given node (namely, the parent node), a second neural network corresponding to a child node from amongst the first set of 8 child nodes, and a third neural network corresponding to the given child node.

Furthermore, the phrase "at least the predefined number of previous neural networks" refers to a minimum predefined number of previous neural networks in said cascade whose outputs are to be passed as the input of the given neural network in said cascade. At the maximum, outputs of all the previous neural networks could be passed as the input of the given neural network. The predefined number of previous neural networks may be user-defined or system-defined. It will be appreciated that when the selected granularity level is considerably higher as compared to the lowest granularity level, the cascade of neural networks need not necessarily comprise one or more neural networks at relatively lower granularity levels including a neural network at the lowest granularity level. Therefore, in such a case, only those neural networks whose (higher) granularity levels that are significantly closer to the selected granularity level are likely to be preferred for inclusion in said cascade. Thus, when utilising the cascade of neural networks, the one or more neural networks could be completely skipped, and outputs from such neural networks could be considered as zero. For example, when there are 5 different granularity levels between the lowest granularity level and the selected granularity level, said cascade may not comprise a neural network corresponding to the root node at the lowest granularity level. This may potentially save processing resources and processing time of the at least one server. It will be appreciated that each of the plurality of neural networks could employ same weights and biases throughout different granularity level, or alternatively, a given neural network at a given granularity level could employ use its own weights and biases. It will also be appreciated that the aforementioned method is susceptible to be applied for a real-world scene having a relatively higher complexity. Since each node at a higher granularity level depends only on nodes at lower granularity levels with respect to said node. This allows for efficient memory usage during inference of the cascade, as only nodes that are necessary for the selected granularity level need to be resident in a memory of the at least one server. Moreover, this potentially reduces memory requirements, and makes the process faster.

Optionally, an input of a given neural network comprises information indicative of a 3D position of a given point in the given real-world environment, and an output of the given neural network comprises an opacity of the given point. Optionally, in this regard, the information indicative of the 3D position of the given point is in form of a 3D position in the given coordinate system. Such a 3D position can be represented as (x, y, z) position coordinates along the X, Y and Z axes, respectively. Optionally, the opacity of the given point is represented by an alpha value. Alpha values are well-known in the art. In some implementations, greater the alpha value, greater is the opacity of the given point, and lower is the transparency of the given point, and vice versa. In addition to this, greater the opacity of the given point, greater is the density of the given point. A non-zero density of the given point means that the given point in the 3D space could be occupied by an opaque object or its part. It is to be understood that when the opacity of the given point is zero or nearly zero, it means the 3D region in the 3D space could either be empty (i.e., surrounded by air), or be occupied by a transparent object or its part. During training of the given neural network, the given neural network learns from the comprehensive information in order to be able to map the input to the output (as discussed earlier in detail). Optionally, when utilising the cascade of neural networks, the opacity of the given point determined using the $N^{th}$ neural network is fed as an input to the $N+1^{th}$ neural network along with the information indicative of the 3D position for further refinement of said opacity. In this way, while traversing through the cascade of neural networks, the opacity of the given point is successively improved, and the opacity of the given point that is determined using the neural network corresponding to the given child node would be highly accurate and precise.

Optionally, the step of utilising the cascade of neural networks comprises stopping a traversal through the cascade of neural networks, if the opacity of the given point is below a predefined threshold value. In this regard, when the opacity of the given point determined using a neural network in said cascade is less than or equal to the predefined threshold value, the at least one server need not utilise subsequent neural networks in said cascade for further refining/improving the opacity of the given point. This is because when the opacity of the given point is less than or equal to the predefined threshold value, it may be highly likely the opacity (namely, a density at the given point) is zero or nearly zero, for example, due to presence of an empty space or a transparent object or its part. Therefore, the traversal through said cascade is halted, and the opacity of the given point determined using said neural network would be considered to be an actual opacity of the given point. Beneficially, this may potentially save computational resources and processing time of the at least one server. Optionally, the predefined threshold value lies in a range of 0 to 0.1. The predefined threshold value may either be system-defined or user-defined. As an example, when the opacity of the given point is zero, the given point may be completely empty/transparent, whereas when the opacity of the given point is one, the given point may be completely opaque.

Optionally, information pertaining to a position of each corner of each node is represented using a respective set of N embeddings, and wherein the information indicative of the 3D position of the given point comprises the 3D position of the given point encoded as a linear interpolation of a set of N embeddings for a given node corresponding to the given neural network. In this regard, the set of N embeddings for the given node is indicative of a position of each corner of the given node. This means that the set of N embeddings does not actually represent a (3D) position of each corner of the given node, but only represent information pertaining to the (3D) position of each corner of the given node. The term "embedding" refers to a mapping of a value (for example, such as numerals) to a continuous vector. In other words, an embedding can be understood to be a string of numbers (that can be trained by a neural network) served as a reference information (for example, in a hash table or similar) for determining an actual position of a corner of the given node. The set of N embeddings is used as an input for the given neural network in order to ascertain the position of each corner of the given node using the hierarchical data structure. In an example, a set of 16 embeddings (A000, B000), (A001, B001), (A002, B002), (A003, B003), (A004, B004), (A005, B005), (A006, B006), and (A007, B007) may represent information pertaining to positions of respective ones of 8 corners of the given node, wherein two embeddings are utilised for each corner of the given node. N is a positive integer, wherein a value of N may be 1, 2, 3, 4, or higher, for each corner of the given node. Furthermore, once the set of N embeddings for the given node is known, 3D positions of points lying inside the given node including the 3D position of the given point can be easily determined using at least one linear interpolation technique. Linear interpolation techniques are well-known in the art. In an example, when the given node is represented as a cube, and 3D positions of all 8 corners of said cube are known from a set of 16 embeddings, a 3D position of a central point (which is also a common corner of 8 smaller cubes into which said cube is divided) can be determined using the at least one linear interpolation technique. Optionally, embeddings are stored in a hash table. Optionally, the given node and its different sets of child nodes have their own respective hash tables. In such a case, different spatial areas of the given real-world environment can be streamed-in and streamed-out as and when required, at a given granularity level. Alternatively, optionally, the given node and its different sets of child nodes have a common/shared hash table. Hash tables are well-known in the art. One way of using the hash table is described, for example, in "*Instant Neural Graphics Primitives with a Multiresolution Hash Encoding*" by Thomas Müller et al., published ACM Transactions on Graphics, 2022, which has been incorporated herein by reference.

Optionally, a same set of N embeddings is used to represent information pertaining to a position of a given corner of a given node and a position of another corner of a given neighbouring node that overlaps with the given corner. In this regard, the given node and the given neighbouring node share at least a common corner. As an example, when the given node is arranged diagonally with respect to the given neighbouring node, the given node and the given neighbouring node may share a common corner. As another example, when the given node is arranged face-to-face with respect to the given neighbouring node, the given node and the given neighbouring node may share four common corners. Therefore, instead of using separate sets of N embeddings for the given corner of the given node and the another corner of the given neighbouring node, the same set of N embeddings is used. The technical benefit of using the same set of N embeddings is that it prevents discontinuities between positions of corners of the given node and the given neighbouring node.

In an embodiment, the input of the given neural network further comprises a direction from the new viewpoint to the given point, and the output of the given neural network further comprises a colour of the given point. In this regard, the (same) given neural network outputs both the opacity of the given point and the colour of the given point. In other words, the opacity of the given point as well as the colour of the given point are corrected/refined by utilising the (same) cascade of neural networks, and thus a separate colour neural network need not be employed for determining the colour of the given point. It will be appreciated that the colour of the given point determined by the given neural network would be a view-dependent colour (or view-dependent irradiance at the given point). The direction from the new viewpoint to the given point defines a direction of a given ray from the new viewpoint of the given point.

Optionally, the given neural network is implemented as a Neural Radiance Field (NeRF) model. Typically, the NeRF model is a deep fully-connected neural network (namely, a machine learning-based model) without any convolutional layers (also referred to as a multilayer perceptron (MLP)). It will be appreciated that when the NeRF model is employed, the input comprises the information indicative of the 3D position as well as the direction from the new viewpoint to the given point, and the output comprises the view-dependent colour and the opacity of the given point.

A regular NeRF can be trained using the plurality of colour images and the viewpoint information. Such a NeRF model is described, for example, in "*NeRF: representing scenes as neural radiance fields for view synthesis*" by Ben Mildenhall et al., published in Proceedings of the European Conference on Computer Vision (ECCV), 2020, which has been incorporated herein by reference. It will be appreciated that any type of neural network (upon training) that could reproduce the given real-world environment, either via novel-view synthesis or by producing a 3D mesh or point cloud can be implemented. As an example, the given neural network may be an MLP with one hidden layer having 16 or 32 neurons in each dimension. Moreover, a colour neural network may be an MLP with 64 neurons in each dimension, and 2 hidden layers.

In an example, when the given neural network is implemented as the NeRF model, using the aforementioned reference for sake of clarity and convenience, the colour of the given point can be mathematically expressed as:

$$C(r) = \int_{tn}^{tf} T(t)\sigma(r(t))c(r(t), d)dt$$

wherein

C(r) is the colour of the given point,

T(t) is an intensity of light that has been blocked till a point 't',

σ(r(t)) is density at the point 't', c(r(t),d) is colour at a point r(t) with respect to a viewing angle 'd', tn is an upper bound for a given ray, and tf is a lower bound for a given ray.

Additionally, when the at least one neural network is implemented as the NeRF model, the aforementioned information could, for example, be represented as (x, y, z, θ, φ), wherein (x, y, z) are the position coordinates as mentioned above, and (θ, φ) are orientation angles with respect to any two of the aforesaid axes. In case of the NeRF model, the position coordinates and the orientation angles correspond to extrinsic parameters of the at least one camera. Furthermore, optionally, the colour of the given point is represented by a colour value. Such a colour value could, for example, be an RGB value, an RGB-A value, a CMYK value, a YUV value, an RGB-D value, an HCL value, an HSL value, an HSB value, an HSV value, an HSI value, a YCbCr value, or similar. It will be appreciated that the input of the given neural network could be encoded to facilitate the given neural network for determining features of an object or its part present in the 3D space at different resolutions. Such an encoding is well-known in the art, and thus could be performed using well-known arithmetic approaches (for example, such as frequency encoding, spherical harmonic encoding, or similar), or could be implemented as a part of training the given neural network (for example, by positional encoding, sparse grid embeddings, or any other similar technique).

In another embodiment, the method further comprises:

training at least one colour neural network for colour reconstruction of objects represented by the plurality of nodes, based on the plurality of colour images and the viewpoint information; and utilising the at least one colour neural network along with the cascade of neural networks, to reconstruct the given portion of the output image, wherein an input of the at least one colour neural network comprises a direction from the new viewpoint to the given point, along with an output of a last neural network in said cascade, and an output of the at least one colour neural network comprises a colour of the given point.

In this regard, upon utilising the cascade of neural networks, the at least one colour neural network is utilised (upon training) for performing the colour reconstruction, i.e., for reconstructing colours in the given portion of the output image. Optionally, when training the at least one colour neural network, the plurality of colour images and the viewpoint information are served as a training dataset to the at least one colour neural network. During the aforesaid training, the at least one colour neural network learns from comprehensive colour information pertaining to the objects present within the 3D space from different perspectives (as represented in the plurality of colour images), in order to be able to accurately and realistically perform the colour reconstruction. The at least one colour neural network is trained in a similar manner as the plurality of neural networks are trained for the 3D reconstruction, as discussed earlier.

When the cascade of neural networks is utilised, the output of the last neural network in said cascade provides the opacity of the given point. Said opacity along with the direction are fed as the input to the at least one colour neural network, for determining the colour of the given point as the output. It will be appreciated that using the output of the last neural network, the at least one colour neural network checks whether or not the opacity of the given point is non-zero (i.e., greater than the predefined threshold value). Optionally, when the opacity of the given point is non-zero, the at least one colour neural network is utilised to determine the colour of the given point. This can be easily performed in a same manner as described in the previous embodiment. Alternatively, optionally, when the opacity of the given point is zero or near zero (i.e., less than or equal to the predefined threshold value), the at least one colour neural network is not traversed to determine the colour of the given point, as the given point has zero or near zero density. Optionally, the input of the at least one colour neural network further comprises outputs of previous neural networks in said cascade, i.e., opacities of the given point that are determined using the previous neural networks.

Optionally, the at least one colour neural network comprises a plurality of colour neural networks for colour reconstruction of objects represented by respective ones of the plurality of nodes, wherein the plurality of colour neural networks comprise different sets of colour neural networks corresponding to the different sets of nodes at the respective ones of the plurality of granularity levels, wherein for the given child node of the selected set of child nodes, the step of utilising the at least one colour neural network along with the cascade of neural networks comprises selecting a colour neural network corresponding to the given child node.

Optionally, the at least one server is configured to train a given colour neural network from amongst the plurality of colour neural networks corresponding to a given node, based on the portions of the plurality of colour images that depict the objects lying inside the given node. In this regard, the given colour neural network corresponds to a given node at a given granularity level. In other words, each node at the given granularity level is associated with a respective colour neural network. As an example, there may be 3 sets of colour neural networks, wherein a first set has a single colour neural network corresponding to the root node at the first granularity level, a second set has 8 colour neural networks corresponding to respective ones of the 8 nodes at the second granularity level, and a third set has 64 colour neural networks corresponding to respective ones of the 64 nodes at the third granularity level, the third granularity level being higher than the second granularity level, which is higher than the first granularity level. It will be appreciated that the different sets of colour neural networks corresponding to the different sets of nodes are capable of generating output images at different resolutions corresponding to their respective granularity levels. All the colour neural networks in a same set would be capable of generating the output images at a same resolution. Moreover, the different sets of colour neural networks also facilitates in generating output images having spatially-variable resolutions. It will be appreciated that the selected colour neural network corresponding to the given child node is at the (same) granularity level at which the given portion of the output image is to be reconstructed. Optionally, an input of the selected colour neural network comprises the output of the last neural network in said cascade, and an output of the selected colour neural network comprises the colour of the given point at the (same) granularity level.

Moreover, optionally, the method further comprises back-propagating gradients from a last neural network of said cascade to a first neural network of said cascade. Herein, the term "gradient" refers to a loss between a ground-truth image and an output image generated using said cascade. Optionally, when back-propagating the gradients from the last neural network to the first neural network, weights and biases of layers in the neural networks in said cascade are updated, in order to minimize an error between the ground-truth image (namely, an actual output) and the output image (namely, an estimated output). Thus, the technical benefit of back-propagating the gradients is that it facilitates in efficiently training the neural networks in said cascade by making them gradually learn and improve their inference/predictions over time. In this way, the plurality of neural networks from the root level to leaf levels could be corrected/improved in one go. Moreover, advantageously, the set of N embeddings for the given node corresponding to the given neural network could also be corrected/improved using back-propagation. Optionally, when back-propagating the gradients, the at least one server is configured to employ a back-propagation technique. It will be appreciated that the back-propagation technique could be used by training algorithms (for example, such as a Gradient Descent algorithm, a Stochastic Gradient Descent (SGD) algorithm, a Mini-Batch Gradient Descent algorithm, an Adam algorithm, an RMSprop algorithm, an Adagrad algorithm, or the like) to update the weights and the biases of the layers in the neural networks in said cascade, during training. The back-propagation technique is well-known in the art.

In an example, when the given neural network is implemented as the NeRF model, the gradients are defined using "loss function" which refers to a mathematical function used for determining an overall squared error between a ground-truth colour of a given point in the given real-world environment and colours of the given point estimated from coarse rendering and fine rendering with the given neural network. The coarse rendering and the fine rendering of colours are well-known in the art. Using the aforementioned reference for sake of clarity and convenience, the loss function can be mathematically expressed as:

$$L = \sum_{r=R} \|Cc(r) - C(r)\|_2^2 + \|Cf(r) - C(r)\|_2^2$$

wherein
L is the loss function,
R is a set of rays corresponding to multiple points,
C(r) is the ground-truth colour of the given point,
Cc(r) is the colour of the given point obtained from the coarse rendering, and
Cf(r) is the colour of the given point obtained from the fine rendering.
Optionally, the method further comprises:
maintaining a data structure for storing information indicative of non-empty nodes;
identifying non-empty nodes in the selected set of child nodes, using said data structure; and
removing empty nodes from the selected set of child nodes, prior to the step of utilising the cascade of neural networks.

The term "non-empty node" refers to a node of the hierarchical data structure that represents at least one physical object (or its part) present within a corresponding region of the 3D space, and therefore, an opacity of a point lying inside a non-empty node is non-zero. Moreover, the term "empty node" refers to a node of the hierarchical data that does not represent any physical object (namely, represent just air) present within a corresponding region of the 3D space, and therefore, an opacity of a point lying inside an empty node is non-zero.

Optionally, the at least one server is configured to identify non-empty regions of the 3D space within which objects lie, based on the viewpoint information and the 3D model of the given real-world environment. In this regard, different viewpoints may be mapped onto the 3D model for identifying the non-empty regions of the 3D space, and thus the non-empty nodes corresponding the non-empty regions can be easily and accurately identified in the hierarchical data structure, as the hierarchical data structure representing the 3D space is readily available to the at least one server.

Once said data structure has information indicative of all the non-empty nodes (for example, in a form of unique node keys), the at least one server can easily identify which nodes in the selected set of child nodes are the non-empty nodes and the empty nodes. Said data structure could, for example, be implemented as a hash table, a bloom filter, a sparse voxel octree, or similar. The aforesaid data structure and their implementations are well-known in the art. Since the empty nodes in the selected set of child nodes do not represent any physical object with a non-zero density, such empty nodes need not be taken into account (i.e., skipped) when utilising the cascade of neural networks for rendering the output image, and therefore are removed from the selected set of child nodes. This may potentially save processing resources and processing time of the at least one server.

Optionally, the method further comprises:
identifying visible nodes in the selected set of child nodes; and
performing the step of utilising the cascade of neural networks for the identified visible nodes in the selected set.

Herein, the visible nodes are child nodes that are visible from the new viewpoint. The visible nodes can be identified based on a depth map of a previous rendered output image and/or the 3D model of the given real-world environment. Such visibility culling may potentially save processing resources and processing time of the at least one server.

The present disclosure also relates to the system and to the computer program product as described above. Various embodiments and variants disclosed above, with respect to the aforementioned method, apply mutatis mutandis to the system and to the computer program product.

Optionally, in the system, an input of a given neural network comprises information indicative of a 3D position of a given point in the given real-world environment, and an output of the given neural network comprises an opacity of the given point.

Optionally, in the system, information pertaining to a position of each corner of each node is represented using a respective set of N embeddings, and wherein the information indicative of the 3D position of the given point comprises the 3D position of the given point encoded as a linear interpolation of a set of N embeddings for a given node corresponding to the given neural network.

Optionally, in the system, a same set of N embeddings is used to represent information pertaining to a position of a given corner of a given node and a position of another corner of a given neighbouring node that overlaps with the given corner.

Optionally, when utilising the cascade of neural networks, the at least one server is configured to stop a traversal through the cascade of neural networks, if the opacity of the given point is below a predefined threshold value.

In an embodiment, the input of the given neural network further comprises a direction from the new viewpoint to the given point, and the output of the given neural network further comprises a colour of the given point.

In another embodiment, the at least one server is configured to:
  train at least one colour neural network for colour reconstruction of objects represented by the plurality of nodes, based on the plurality of colour images and the viewpoint information; and
  utilise the at least one colour neural network along with the cascade of neural networks, to reconstruct the given portion of the output image, wherein an input of the at least one colour neural network comprises a direction from the new viewpoint to the given point, along with an output of a last neural network in said cascade, and an output of the at least one colour neural network comprises a colour of the given point.

Optionally, the at least one colour neural network comprises a plurality of colour neural networks for colour reconstruction of objects represented by respective ones of the plurality of nodes, wherein the plurality of colour neural networks comprise different sets of colour neural networks corresponding to the different sets of nodes at the respective ones of the plurality of granularity levels,
  wherein for the given child node of the selected set of child nodes, when utilising the at least one colour neural network along with the cascade of neural networks, the at least one server is configured to select a colour neural network corresponding to the given child node.

Optionally, the at least one server is configured to create the hierarchical data structure by iteratively dividing the 3D space into the plurality of nodes, wherein a highest granularity level to which a given node of the hierarchical data structure is to be divided is determined based on a highest resolution in which a portion of at least one of the plurality of colour images representing a given region of the 3D space that corresponds to the given node is available.

Optionally, the at least one server is configured to backpropagate gradients from a last neural network of said cascade to a first neural network of said cascade.

Optionally, the at least one server is configured to:
  maintain a data structure for storing information indicative of non-empty nodes;
  identify non-empty nodes in the selected set of child nodes, using said data structure; and
  remove empty nodes from the selected set of child nodes, prior to utilise the cascade of neural networks.

DETAILED DESCRIPTION OF THE DRAWINGS

Referring to FIG. 1, illustrated is a block diagram of an architecture of a system 100 incorporating multiresolution neural networks for three-dimensional (3D) reconstruction, in accordance with an embodiment of the present disclosure.

The system 100 comprises at least one server (depicted as a server 102), and at least one data repository (depicted as a data repository 104) that is communicably coupled to the server 102. The server 102 is configured to perform various operations, as described earlier with respect to the aforementioned second aspect.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of servers and data repositories. The person skilled in the art will recognize many variations, alternatives, and modifications of embodiments of the present disclosure.

Figure 2A:
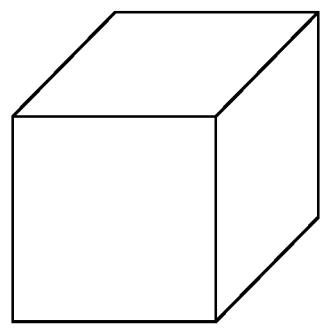
FIGS. 2A, 2B, 2C, and 2D are schematic representations of a hierarchical data structure utilised to represent a three-dimensional (3D) space occupied by a real-world environment at different granularity levels, in accordance with an embodiment of the present disclosure.
Figure 2B:
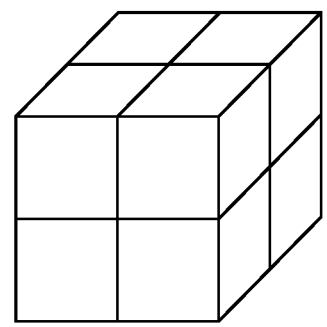
Figure 2C:
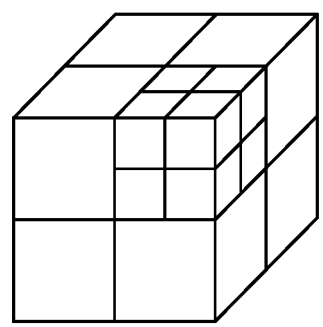
Figure 2D:
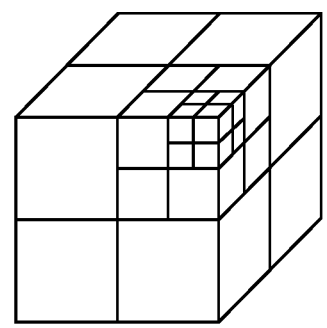

Referring to FIGS. 2A, 2B, 2C, and 2D, illustrated are schematic representations of a hierarchical data structure utilised to represent a three-dimensional (3D) space occupied by a real-world environment at different granularity levels, in accordance with an embodiment of the present disclosure. With reference to FIGS. 2A-2D, the hierarchical data structure is implemented as an Octree data structure, for the sake of convenience only. With reference to FIG. 2A, there is shown a root level node of the Octree data structure, wherein the root level node is at a first granularity level that is a lowest granularity level (namely, a coarsest granularity level or a lowest level of detail) from amongst the different granularity levels. The root level node is represented as a single cube encompassing an entirety of the 3D space occupied by the real-world environment. With reference to FIG. 2B, there is shown that the root level node is divided into a set of 8 equi-sized nodes (depicted as 8 equi-sized octants), wherein each node in said set is at a second granularity level that is greater than (namely, finer than) the first granularity level. With reference to FIG. 2C, there is shown that a node (for example, depicted as a front top-right node, for sake of clarity and convenience) from amongst the set of the 8 equi-sized nodes being further divided into a set of 8 equi-sized child nodes (depicted as 8 equi-sized octants), wherein each child node in said set is at a third granularity level that is greater than the first granularity level and the second granularity level. With reference to FIG. 2D, there is shown another child node (for example, a front top-right child node, for sake of clarity and convenience) being further divided into a set of 8 equi-sized child nodes (depicted as 8 equi-sized octants), wherein each child node in said set is at a fourth granularity level that is greater than the first granularity level, the second granularity level, and the third granularity level.

Figure 3:
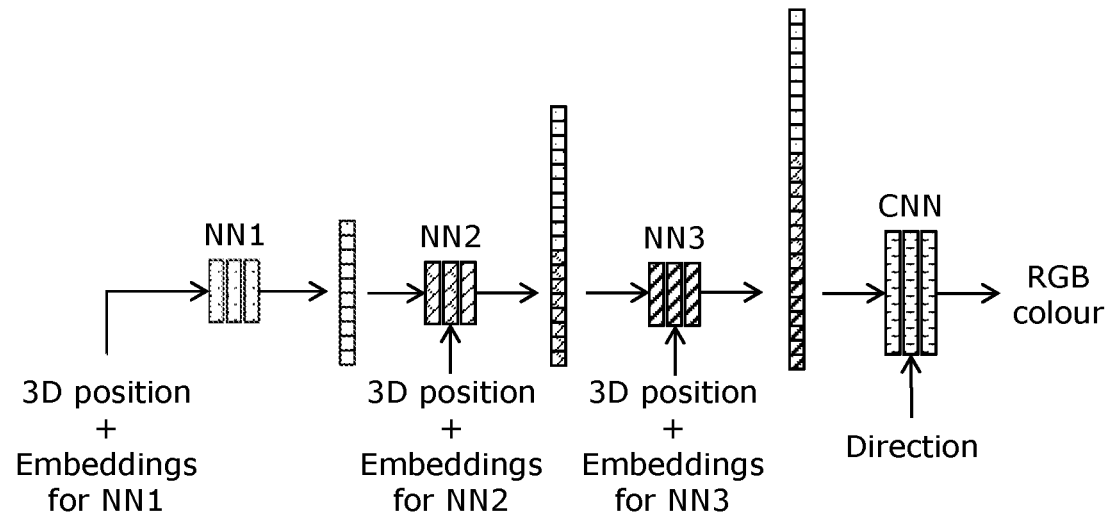
FIG. 3 illustrates a schematic illustration of utilising a cascade of neural networks along with a colour neural network, to reconstruct a portion of an output image, in accordance with an embodiment of the present disclosure.

Referring to FIG. 3, illustrated is a schematic illustration of utilising a cascade of neural networks along with a colour neural network (marked 'CNN', depicted using a horizontal stripes pattern) to reconstruct a portion of an output image, in accordance with an embodiment of the present disclosure. As shown, the cascade of the neural networks comprises three neural networks namely, a first neural network (NN1, depicted using a dotted pattern) at a first granularity level, a second neural network (NN2, depicted using a diagonal brick pattern) at a second granularity level, and a third neural network (NN3, depicted using a diagonal line pattern) at a third granularity level. The third granularity level is higher than both the first granularity level and the second granularity level, and the second granularity level is higher than the first granularity level. The aforesaid cascade can be utilised for a given child node at the third granularity level, to reconstruct the portion of the output image from a perspective of a new viewpoint.

An input of the NN1 comprises information indicative of a 3D position of a given point in a given real-world environment, wherein the 3D position is encoded as a linear interpolation of a set of N embeddings for a given node corresponding to the NN1. An output of the NN1 (for example, depicted as an array of 10 dotted pattern boxes) comprises an opacity of the given point. An input of the NN2 comprises the output of the NN1 along with information indicative of the 3D position of the given point encoded as a linear interpolation of a set of N embeddings for a given node corresponding to the NN2. An output of the NN2 (for example, depicted as an array of 10 dotted pattern boxes and 8 diagonal brick pattern boxes) comprises an opacity of the given point. An input of the NN3 comprises outputs of the NN1 and the NN2, along with information indicative of the 3D position of the given point encoded as a linear interpolation of a set of N embeddings for a given child node corresponding to the NN3. An output of the NN3 (for example, depicted as an array of 10 dotted pattern boxes, 8 diagonal brick pattern boxes, and 7 diagonal line pattern boxes) comprises an opacity of the given point. Furthermore, an input of the CNN comprises a direction from the new viewpoint to the given point, along with the output of the NN3, and an output of the CNN comprises a Red-Green-Blue (RGB) colour of the given point.

Figure 4:
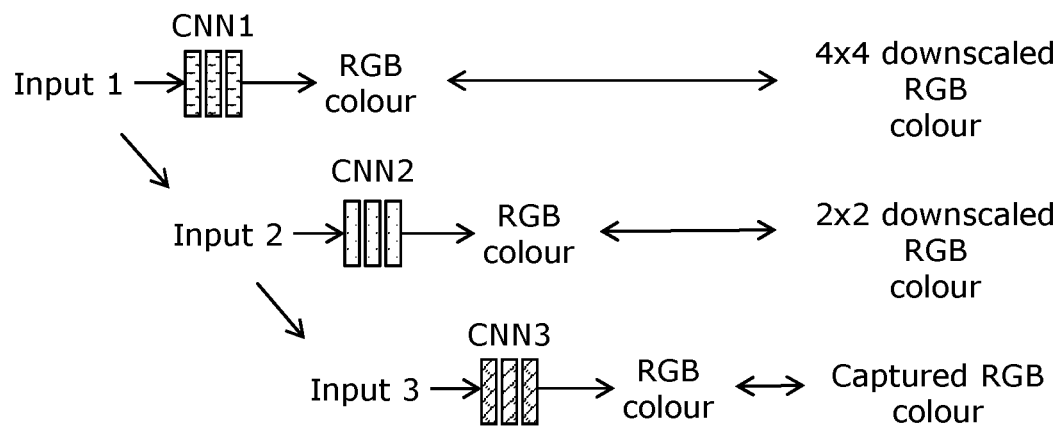
FIG. 4 illustrates a schematic illustration of training different colour neural networks at different granularity levels, in accordance with an embodiment of the present disclosure.

Referring to FIG. 4, illustrated is a schematic illustration of training different colour neural networks at different granularity levels, in accordance with an embodiment of the present disclosure. As shown, there are three colour neural networks namely, a first colour neural network (marked 'CNN1', depicted using a horizontal stripes pattern) at a first granularity level, a second colour neural network (marked 'CNN2', depicted using a dotted pattern) at a second granularity level, and a third colour neural network (marked 'CNN3', depicted using a diagonal brick pattern) at a third granularity level. The third granularity level is higher than both the first granularity level and the second granularity level, and the second granularity level is higher than the first granularity level. Each colour neural network is utilised along with a cascade of neural networks, to reconstruct colours in a given portion of an output image from a perspective of a new viewpoint. The reconstructed colours in the given portion are then compared with ground-truth colours of the given portion, for determining an error between the reconstructed colours and the ground-truth colours. This facilitates in continuously training a given colour neural network for improved accuracy. For the CNN1, ground-truth images are generated by downscaling and/or convoluting a plurality of (original) colour images to match the first granularity level. As an example, for the CNN1, a ground-truth image may be a 4×4 downscaled version of an (original) RGB colour image. For the CNN2, ground-truth images are generated by downscaling and/or convoluting the plurality of colour images to match the second granularity level. As an example, for the CNN2, a ground-truth image may be a 2×2 downscaled version of the (original) RGB colour image. For the CNN3, ground-truth images are the plurality of (original) colour images.

An input of the CNN1 comprises a direction from the new viewpoint to a given point in a given real-world environment, along with an output of a last neural network in said cascade, the last neural network being at the first granularity level. An output of the CNN1 comprises a Red-Green-Blue (RGB) colour of the given point, which is then compared with a 4×4 downscaled RGB colour to continuously train/improve the CNN1.

Similarly, an input of the CNN2 comprises the direction along with an output of a last neural network in said cascade, the last neural network being at the second granularity level. An output of the CNN2 comprises an RGB colour of the given point, which is then compared with a 2×2 downscaled RGB colour to continuously train/improve the CNN2. Further, an input of the CNN3 comprises the direction along with an output of a last neural network in said cascade, the last neural network being at the third granularity level. An output of the CNN3 comprises an RGB colour of the given point, which is then compared with originally captured (i.e., non-downscaled) RGB colour to continuously train/improve the CNN3.

FIGS. 3 and 4 are merely examples, which should not unduly limit the scope of the claims herein. The person skilled in the art will recognize many variations, alternatives, and modifications of embodiments of the present disclosure.

Figure 5:
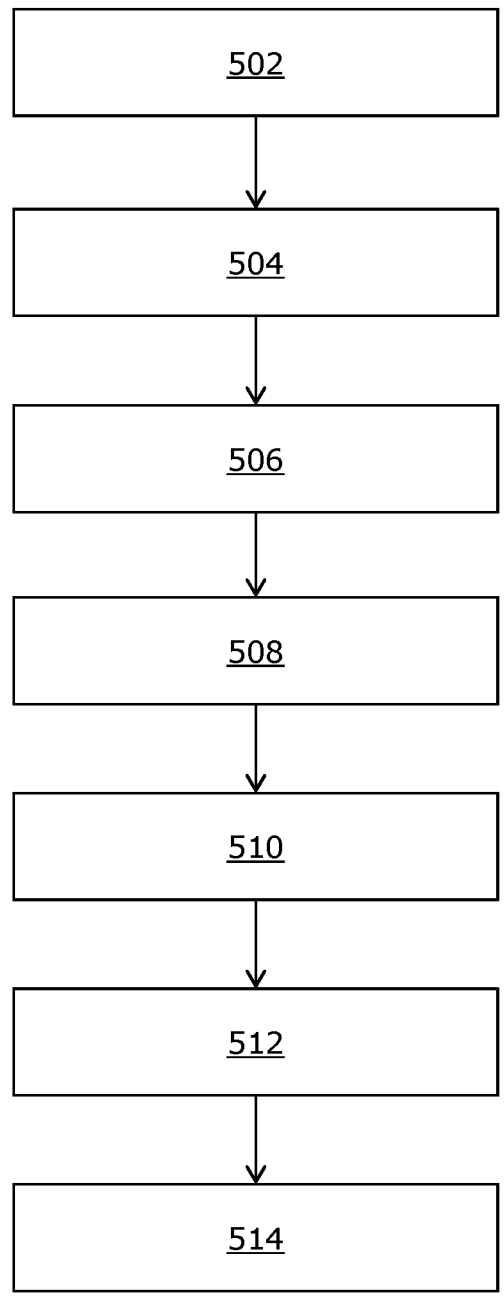
FIG. 5 illustrates steps of a computer-implemented method incorporating multiresolution neural networks for three-dimensional (3D) reconstruction, in accordance with an embodiment of the present disclosure.

Referring to FIG. 5, illustrated are steps of a computer-implemented method incorporating multiresolution neural networks for three-dimensional (3D) reconstruction, in accordance with an embodiment of the present disclosure. At step 502, a plurality of colour images of a given real-world environment, and viewpoint information are received, the viewpoint information being indicative of corresponding viewpoints from which the plurality of colour images are captured. At step 504, a hierarchical data structure is utilised to represent a 3D space occupied by the given real-world environment at a plurality of granularity levels, the hierarchical data structure comprising a plurality of nodes, wherein the plurality of nodes comprise different sets of nodes at respective ones of the plurality of granularity levels. At step 506, a plurality of neural networks are trained for 3D reconstruction of objects represented by respective ones of the plurality of nodes, based on the plurality of colour images and the viewpoint information, wherein the plurality of neural networks comprise different sets of neural networks corresponding to the different sets of nodes at the respective ones of the plurality of granularity levels. For a given portion of an output image that is to be reconstructed from a perspective of a new viewpoint, at step 508, a granularity level at which the given portion of the output image is to be reconstructed is determined, based on at least one of: a resolution at which the given portion is being reconstructed, a distance of the new viewpoint from objects being represented in the given portion, whether the given portion corresponds to a user's gaze. At step 510, a given node is identified in the hierarchical data structure, the given node corresponds to a given region of the 3D space within which said objects lie, wherein the given node has different sets of child nodes. At step 512, a set of child nodes is selected, from amongst the different sets of child nodes, that is at the granularity level at which the given portion of the output image is to be reconstructed. For a given child node of the selected set of child nodes, at step 514, a cascade of neural networks that ends at a neural network corresponding to the given child node is utilised, to reconstruct the given portion of the output image, wherein a granularity level of an $N+1^{th}$ neural network in the cascade is higher than a granularity level of an $N^{th}$ neural network in the cascade, further wherein an input of a given neural network in said cascade comprises outputs of at least a predefined number of previous neural networks in said cascade.

The aforementioned steps are only illustrative and other alternatives can also be provided where one or more steps are added, one or more steps are removed, or one or more steps are provided in a different sequence without departing from the scope of the claims herein.

The invention claimed is:

1. A computer-implemented method comprising:
   receiving a plurality of colour images of a given real-world environment, and viewpoint information indicative of corresponding viewpoints from which the plurality of colour images are captured;
   utilising a hierarchical data structure to represent a 3D space occupied by the given real-world environment at a plurality of granularity levels, the hierarchical data structure comprising a plurality of nodes, wherein the plurality of nodes comprise different sets of nodes at respective ones of the plurality of granularity levels;
   training a plurality of neural networks for 3D reconstruction of objects represented by respective ones of the plurality of nodes, based on the plurality of colour images and the viewpoint information, wherein the plurality of neural networks comprise different sets of neural networks corresponding to the different sets of nodes at the respective ones of the plurality of granularity levels; and
   for a given portion of an output image that is to be reconstructed from a perspective of a new viewpoint,
      determining a granularity level at which the given portion of the output image is to be reconstructed, based on at least one of: a resolution at which the given portion is being reconstructed, a distance of the new viewpoint from objects being represented in the given portion, whether the given portion corresponds to a user's gaze;
      identifying a given node in the hierarchical data structure that corresponds to a given region of the 3D space within which said objects lie, wherein the given node has different sets of child nodes;
      selecting a set of child nodes, from amongst the different sets of child nodes, that is at the granularity level at which the given portion of the output image is to be reconstructed; and
      for a given child node of the selected set of child nodes, utilising a cascade of neural networks that ends at a neural network corresponding to the given child node, to reconstruct the given portion of the output image, wherein a granularity level of an $N+1^{th}$ neural network in the cascade is higher than a granularity level of an $N^{th}$ neural network in the cascade, further wherein an input of a given neural network in said cascade comprises outputs of at least a predefined number of previous neural networks in said cascade.

2. The computer-implemented method of claim 1, wherein an input of a given neural network comprises information indicative of a 3D position of a given point in the given real-world environment, and an output of the given neural network comprises an opacity of the given point.

3. The computer-implemented method of claim 2, wherein information pertaining to a position of each corner of each node is represented using a respective set of N embeddings, and wherein the information indicative of the 3D position of the given point comprises the 3D position of the given point encoded as a linear interpolation of a set of N embeddings for a given node corresponding to the given neural network.

4. The computer-implemented method of claim 3, wherein a same set of N embeddings is used to represent information pertaining to a position of a given corner of a given node and a position of another corner of a given neighbouring node that overlaps with the given corner.

5. The computer-implemented method of claim 2, wherein the step of utilising the cascade of neural networks comprises stopping a traversal through the cascade of neural networks, if the opacity of the given point is below a predefined threshold value.

6. The computer-implemented method of claim 2, wherein the input of the given neural network further comprises a direction from the new viewpoint to the given point, and the output of the given neural network further comprises a colour of the given point.

7. The computer-implemented method of claim 1, further comprising:
   training at least one colour neural network for colour reconstruction of objects represented by the plurality of nodes, based on the plurality of colour images and the viewpoint information; and
   utilising the at least one colour neural network along with the cascade of neural networks, to reconstruct the given portion of the output image, wherein an input of the at least one colour neural network comprises a direction from the new viewpoint to a given point, along with an output of a last neural network in said cascade, and an output of the at least one colour neural network comprises a colour of the given point.

8. The computer-implemented method of claim 7, wherein the at least one colour neural network comprises a plurality of colour neural networks for colour reconstruction of objects represented by respective ones of the plurality of nodes, wherein the plurality of colour neural networks comprise different sets of colour neural networks corresponding to the different sets of nodes at the respective ones of the plurality of granularity levels,
   wherein for the given child node of the selected set of child nodes, the step of utilising the at least one colour neural network along with the cascade of neural networks comprises selecting a colour neural network corresponding to the given child node.

9. The computer-implemented method of claim 1, further comprising creating the hierarchical data structure by iteratively dividing the 3D space into the plurality of nodes, wherein a highest granularity level to which a given node of the hierarchical data structure is to be divided is determined based on a highest resolution in which a portion of at least one of the plurality of colour images representing a given region of the 3D space that corresponds to the given node is available.

10. The computer-implemented method of claim 1, further comprising back-propagating gradients from a last neural network of said cascade to a first neural network of said cascade.

11. The computer-implemented method of claim 1, further comprising:
   maintaining a data structure for storing information indicative of non-empty nodes;
   identifying non-empty nodes in the selected set of child nodes, using said data structure; and
   removing empty nodes from the selected set of child nodes, prior to the step of utilising the cascade of neural networks.

12. A system comprising:
   at least one data repository; and
   at least one server configured to:
      receive a plurality of colour images of a given real-world environment, and viewpoint information indicative of corresponding viewpoints from which the plurality of colour images are captured;

utilise a hierarchical data structure to represent a 3D space occupied by the given real-world environment at a plurality of granularity levels, the hierarchical data structure comprising a plurality of nodes, wherein the plurality of nodes comprise different sets of nodes at respective ones of the plurality of granularity levels, and wherein the hierarchical data structure is stored at the at least one data repository;

train a plurality of neural networks for 3D reconstruction of objects represented by respective ones of the plurality of nodes, based on the plurality of colour images and the viewpoint information, wherein the plurality of neural networks comprise different sets of neural networks corresponding to the different sets of nodes at the respective ones of the plurality of granularity levels; and for a given portion of an output image that is to be reconstructed from a perspective of a new viewpoint,
determine a granularity level at which the given portion of the output image is to be reconstructed, based on at least one of: a resolution at which the given portion is being reconstructed, a distance of the new viewpoint from objects being represented in the given portion, whether the given portion corresponds to a user's gaze;
identify a given node in the hierarchical data structure that corresponds to a given region of the 3D space within which said objects lie, wherein the given node has different sets of child nodes;
select a set of child nodes, from amongst the different sets of child nodes, that is at the granularity level at which the given portion of the output image is to be reconstructed; and
for a given child node of the selected set of child nodes, utilise a cascade of neural networks that ends at a neural network corresponding to the given child node, to reconstruct the given portion of the output image, wherein a granularity level of an $N+1^{th}$ neural network in the cascade is higher than a granularity level of an $N^{th}$ neural network in the cascade, further wherein an input of a given neural network in said cascade comprises outputs of at least a predefined number of previous neural networks in said cascade.

13. The system of claim 12, wherein an input of a given neural network comprises information indicative of a 3D position of a given point in the given real-world environment, and an output of the given neural network comprises an opacity of the given point.

14. The system of claim 13, wherein information pertaining to a position of each corner of each node is represented using a respective set of N embeddings, and wherein the information indicative of the 3D position of the given point comprises the 3D position of the given point encoded as a linear interpolation of a set of N embeddings for a given node corresponding to the given neural network.

15. The system of claim 14, wherein a same set of N embeddings is used to represent information pertaining to a position of a given corner of a given node and a position of another corner of a given neighbouring node that overlaps with the given corner.

16. The system of claim 13, wherein when utilising the cascade of neural networks, the at least one server is configured to stop a traversal through the cascade of neural networks, if the opacity of the given point is below a predefined threshold value.

17. The system of claim 13, wherein the input of the given neural network further comprises a direction from the new viewpoint to the given point, and the output of the given neural network further comprises a colour of the given point.

18. The system of claim 12, wherein the at least one server is configured to:
train at least one colour neural network for colour reconstruction of objects represented by the plurality of nodes, based on the plurality of colour images and the viewpoint information; and
utilise the at least one colour neural network along with the cascade of neural networks, to reconstruct the given portion of the output image, wherein an input of the at least one colour neural network comprises a direction from the new viewpoint to a given point, along with an output of a last neural network in said cascade, and an output of the at least one colour neural network comprises a colour of the given point.

19. The system of claim 18, wherein the at least one colour neural network comprises a plurality of colour neural networks for colour reconstruction of objects represented by respective ones of the plurality of nodes, wherein the plurality of colour neural networks comprise different sets of colour neural networks corresponding to the different sets of nodes at the respective ones of the plurality of granularity levels,
wherein for the given child node of the selected set of child nodes, when utilising the at least one colour neural network along with the cascade of neural networks, the at least one server is configured to select a colour neural network corresponding to the given child node.

20. The system of claim 12, wherein the at least one server is configured to create the hierarchical data structure by iteratively dividing the 3D space into the plurality of nodes, wherein a highest granularity level to which a given node of the hierarchical data structure is to be divided is determined based on a highest resolution in which a portion of at least one of the plurality of colour images representing a given region of the 3D space that corresponds to the given node is available.

21. The system of claim 12, wherein the at least one server is configured to back-propagate gradients from a last neural network of said cascade to a first neural network of said cascade.

22. The system of claim 12, wherein the at least one server is configured to:
maintain a data structure for storing information indicative of non-empty nodes;
identify non-empty nodes in the selected set of child nodes, using said data structure; and
remove empty nodes from the selected set of child nodes, prior to utilise the cascade of neural networks.

23. A computer program product comprising a non-transitory machine-readable data storage medium having stored thereon program instructions that, when executed by a processor, cause the processor to execute steps of a computer-implemented method of claim 1.

* * * * *